Aug. 22, 1950

H. ORNER 2,519,394

ROTARY POWER CONTROL DEVICE

Filed Aug. 28, 1943

INVENTOR
Harry Orner

Patented Aug. 22, 1950

2,519,394

UNITED STATES PATENT OFFICE 2,519,394

ROTARY POWER CONTROL DEVICE

Harry Orner, Cleveland Heights, Ohio

Application August 28, 1943, Serial No. 500,448

18 Claims. (Cl. 74—339)

This invention relates to power control devices, and particularly to rotary power control devices which increase (or decrease) the angular velocity of a rotary member.

This invention is particularly applicable to the driving of rotary loads; and to cases in which it is desirable to have the speed of the load increase (or decrease); and, the invention comprises means by which changes in the angular velocity of the load are effected by the movement of a mass, rotating with the load, toward or away from the axis of rotation.

The primary object of this invention is to provide a device to cause an increase in the angular velocity of a rotating body.

Another object of this invention is to provide a device to potentially store energy of a rotating body and to utilize the stored energy to increase the angular velocity of the rotating body.

Another object of this invention is to provide a device to increase the kinetic energy of a rotating body at any selected instant.

Another object of this invention is to provide a device to be used in connection with a power transmission to establish an angular velocity for the driven shaft having such relation to the angular velocity of the drive shaft as to permit changing the gear ratio of the power transmission.

Another object of this invention is to provide a device which may be disposed between a source of power and a rotating load to function as a control for the angular velocity of the load, to effect an increase or decrease of the angular velocity of the load at any select instant.

Other objects of my invention will become apparent from the following detailed description of embodiments thereof illustrated in the accompanying drawings and particularly pointed out in the claims, such disclosed means being merely illustrative of the various mechanical forms in which the principles of this invention may be embodied.

In the said accompanying drawings:

Fig. 1 diagrammatically illustrates an embodiment of my invention with parts in section.

Fig. 2 diagrammatically illustrates an embodiment of my invention different from the one above, with parts in section.

Fig. 3 diagrammatically illustrates another embodiment of my invention using another form of energy.

Figure 1:
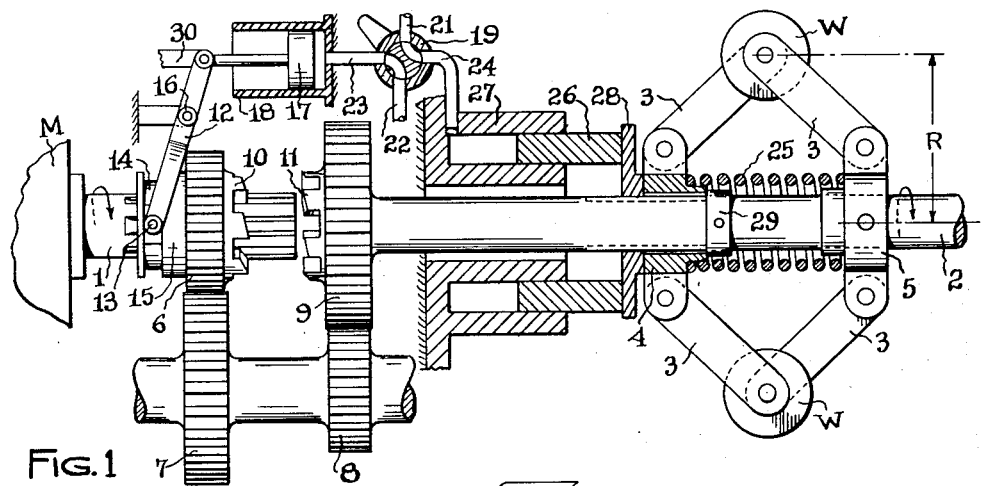

Referring to Fig. 1, which illustrates diagrammatically an embodiment of my invention, a mass consisting of two bodies of weights W—W rotatably supported on a shaft 2 at a distance R from the axis of rotation. The weights W—W are each pivotally connected to the ends of two links 3—3, which in turn have their respective opposite ends pivotally connected respectively to a sleeve 4, and a collar 5. Sleeve 4 is keyed or splined to shaft 2 and free to move longitudinally. Collar 5 is fixed to shaft 2. This arrangement constitutes a simple means whereby any movement of sleeve 4 along shaft 2 will cause a relative movement of weights W—W with respect to the center of rotation of the shaft 2, the weights being movable from a distance R as shown in Fig. 1, to a distance $r$ similar to that shown in Fig. 2.

In this construction, if the shaft 2 is rotating, and the weights W—W, being at a distance R from the center of rotation, are moved in by some outside force to a shorter distance $r$, the entire system will increase in angular velocity. When returned to the original distance R, the angular velocity will similarly decrease. This principle of mechanics is familiar to those understanding the subject of moments of momentum.

It can be well established that the moment of momentum is not altered when the configuration is changed by forces which exert no torque about the axis. On the other hand kinetic energy of the system is changed. The kinetic energy varies as the square of the angular velocity while the momentum varies as the first power of the angular velocity. When the moment of inertia is doubled, the angular velocity becomes one-half as great and the kinetic energy becomes one-half as great. In a system such as that shown in Fig. 1, if the bodies or weights W—W are moved toward the axis of rotation, considerable work must be exerted to so move them. The work done on the system represents an increase of kinetic energy.

This invention has many applications and one particular application is in the transmission of a motor driven vehicle. In the current transmission the angular velocity of the driven members is controlled by a clutch and shifting gears. The power is disconnected by the clutch as the vehicle gains momentum, releasing the tooth pressure of the meshing gears to permit them to be shifted. This method of shifting gears requires a degree of skill and a measure of the operator's attention, besides the danger of clashing gears and possible resulting damage to the mechanism. The embodiments illustrated in Figs. 1 and 2 provide a novel method of utilizing the principle of this invention to release the tooth pressure of the gears of a transmission to permit the gears to be shifted and to also assist in accelerating the load at the same instant.

Figure 2:
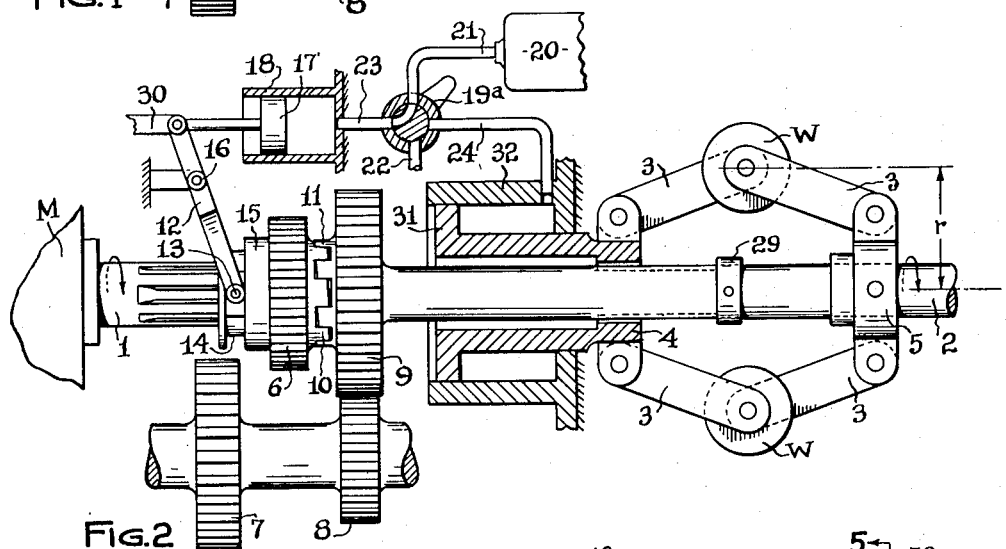

In Figs. 1 and 2, a gear train consisting of gears 6, 7, 8 and 9 rotatably connect a drive shaft 1 to a driven shaft 2, whereby the drive shaft 1, rotated by a prime-mover or motor M, drives the driven shaft 2 at a reduced gear ratio. Gear 6 is splined on shaft 1 and moveable longitudinally along shaft 1 to effect a direct connection between the shafts 1 and 2 to effect a direct drive. Angular projecting clutch teeth 10 on gear 6 engageable with coacting projecting clutch teeth 11 on gear 9 constitute the direct drive.

A forked lever 12, having aligned inwardly extending trunnions 13 on a common axis, fitting into an annular groove 14 in a hub projection 15 of gear 6, is provided in such manner as to permit the gear 6 to freely rotate, and to be moved longitudinally. Lever 12 is pivoted on a stub shaft 16, the upper end being in moveable connection with piston 17 actuated in a cylinder 18. A valve 19 controls a source of compressed air or other fluid from a source such as tank 20, similar to that shown in Fig. 2, through line 21. Valve 19 has an exhaust line 22, a line 23 leading to cylinder 18, and a line 24 leading to parts to be further explained. In Figs. 1 and 2, as explained above, the mechanism is similar in each of these two embodiments, and this mechanism as shown in each of the two views is in different positions to illustrate the relative motions.

The embodiment of Fig. 1 has a spring 25 disposed between stationary collar 5 and sleeve 4 tending to move sleeve 4 away from collar 5. A moveable piston 26 fitted into a stationary cylinder 27 is so constructed as to be actuated by a fluid, preferably compressed air, from a line 24, to move piston 26 against a hardened washer 28 bearing against sleeve 4, tending to move sleeve 4 to a fixed stop such as a collar 29 fixed to shaft 2.

In operation, the motor M rotating the drive shaft 1 will drive the driven shaft 2 and the load thereon at a gear reduction ratio determined by the gear train 6, 7, 8 and 9 as shown in Fig. 1. The valve 19 moved to the position shown in Fig. 1, permits compressed air from line 21 to pass through the ducts of the valve 19, through the line 24, into cylinder 27, to move piston 26 against the washer 28, to move sleeve 4 until stopped by collar 29, thereby compressing spring 25 and also moving the weights W—W to a distance R from the axis of rotation.

The motor M will now drive a resisting load (not shown) on driven shaft 2, through the gears 6, 7, 8 and 9 at a gear reduction ratio, until the driven load has acquired the desired momentum. It is then desirable to shift to a less gear ratio or to direct drive. The valve 19 is accordingly moved to a position connecting line 24 to exhaust line 22, and air pressure line 21 to line 23, to permit the air in cylinder 27 to escape through line 22 and to cause the air pressure from line 21 to actuate the piston 17 in cylinder 18. The spring 25 will now be free to expand, moving sleeve 4 away from collar 5 and causing the weights W—W to finally approach a position at distance r from the axis of rotation, similar to that shown in Fig. 2. The angular velocity of the driven shaft 2 is thereby increased as explained, and the tooth pressure of the shifting gear 6 and meshing gear 7 is decreased to a point permitting shifting of the gear 6 by the actuated piston 17 in cylinder 18 and the forked lever 12, to a position similar to that shown in Fig. 2, causing the clutch teeth 11 and 12 to interlock to produce a direct drive between the drive shaft 1 and driven shaft 2, and assisting the motor M to accelerate the system. The shifting of gear 6 may be actuated manually if desired by manually reciprocating the link 30, and rocking the lever 12 in which case the valve 19 would be left in the position shown in Fig. 1 in which it exhausts the cylinder 18, to allow the piston 17 to reciprocate idly in the cylinder 18.

The shifting of the gear 6 is therefore done without disconnecting the rotary power of the motor M by a clutch or similar mechanism, and the kinetic energy of the expanding spring 25 is added at this instant to the rotary system, and therefore at the instant when most desired. It will also be noticed that kinetic energy previously stored at a less critical period of operation supplements the rotary inertia of the system during the period of gear shifting.

The spring 25 is an illustrative example of any means to absorb energy from the system to be utilized at a selected instant. Any other means can be similarly applied to store energy and to expand this stored energy at the desired instant, to move the weights W—W from a distance R from the center of rotation, to a smaller distance r, to cause an acceleration of the system. Another such means is illustrated in Fig. 2, having the same reference characters for similar parts and the mechanism is shown in a functional alternate position to facilitate explaining the function. In this instance a piston 31 integral with sleeve 4 is fitted into cylinder 32. The valve 19a has only a single duct.

The action is similar to that shown in Fig. 1, except that energy is stored by compressed air into a tank 20 by any means, preferably by a pump rotatably connected to motor M, the structure of which may be general and well known.

In this form the drive shaft 1, rotated by the motor M drives the driven shaft 2 by the interconnecting gears 6, 7, 8 and 9, at a reduced gear ratio, similar to that shown in Fig. 1, until the driven load has acquired the desired momentum. It is then desirable to shift to a less gear ratio or to direct drive. The valve 19a is accordingly moved to a position connecting line 21 and line 24, to permit air under pressure in tank 20 to enter the cylinder 32, and move the piston 31 in such direction as to cause the weights W—W by the connecting links 3—3 to be moved from the distance R similar to that shown in Fig. 1, to the distance r as shown in Fig. 2, to thereby increase the angular velocity of the system and to permit the shifting of gear 6 as explained for Fig. 1. The gear 6 can be actuated by rotating valve 19a to position shown in Fig. 2, connecting line 21 and line 23 to move piston 17 as explained. The cylinder 32 and cylinder 18 can be relieved of the compressed air at any desired time by moving the valve 19a to a position to either line 24 with exhaust line 22, or line 23 with exhaust line 22, respectively.

This illustrates a method of using compressed gases as a medium of stored energy to actuate the moving of a mass to a lesser radius of rotation to cause an increased angular velocity of the system and to add kinetic energy at a predetermined instant of operation to assist the full torque of the motor M to drive the required load.

Thus it has been shown above that shifting of gears can be made to occur directly by incorporating the principle of this invention and thereby eliminating the use of a disengaging clutch or the slowing of the driven members; and that the full torque value of the prime-mover can be applied at the instant of shifting which is the most effective instant for the maximum rate. The illustrated example of Fig. 1 and Fig. 2, are simple forms of transmissions but are sufficient to disclose to those familiar with the art how to incorporate this invention in any complex type of shifting gears, and that in all cases the driven member will be increased in angular velocity to increase the driven load and release the tooth pressure of the shifting gears.

This invention may be incorporated in transmissions of the type which do not make use of shifting gears, to assist the driven shafts and the load thereon to be accelerated by the rotating power of the driving shafts. For examples of such transmissions references may be made to the applicant's Patents Nos. 2,330,374 and 2,330,375. In general any device required to be accelerated by rotary power can incorporate this invention to assist the rotary power to drive the driven members to accelerate the driven load. A good example of such applications would be the rotating of the landing wheels of an aircraft which will be further discussed.

Two examples of stored energy have been shown in the Figs. 1 and 2, to move the weights W—W inward as the members increase in angular velocity, namely mechanical compression of a spring, and the pneumatic compression of a gas, respectively. This invention is not limited to these types of energy to be stored to actuate the weights W—W, since any form of energy may be so stored to actuate the weights W—W at a selected instant. To further illustrate this, another embodiment of my invention will be explained.

Figures 3, 4, 5:
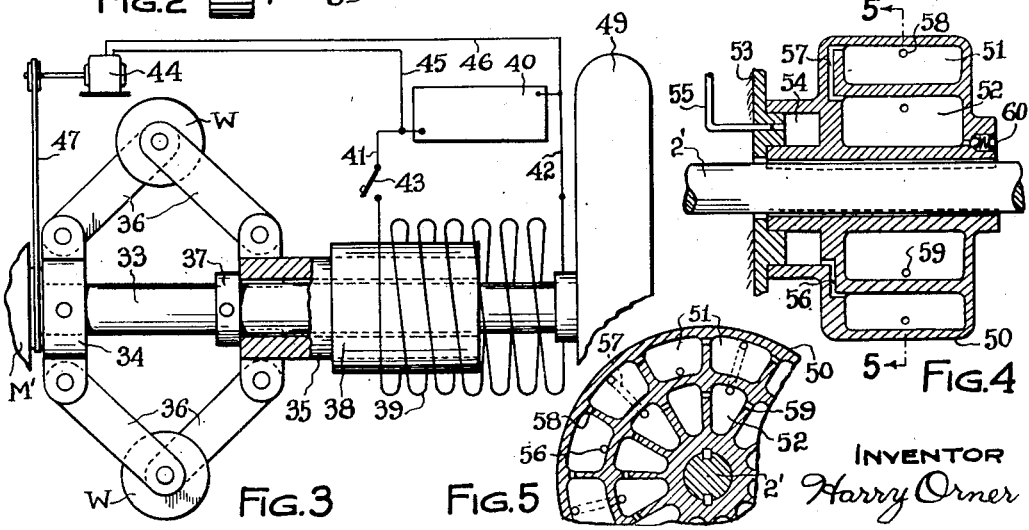
Fig. 4 is a view of another embodiment of my invention illustrating the use of another form of mass.
Fig. 5 is a sectional view taken on plane 5—5 of Fig. 4.

Diagrammatically illustrated in Fig. 3, is a driven power mechanism M' driving a shaft 33 having a fixed collar 34 and a sleeve 35 moveable along shaft 33 but keyed to rotate with shaft 33. Weights W—W are connected pivotally to collar 34 and sleeve 35 by links 36—36, in such manner as to move the weights W—W inwardly and outwardly with respect to the center of rotation of the shaft 33, by movement of sleeve 35 along shaft 33. A stop consisting of a collar 37 fixed to shaft 33 limits the movement of sleeve 35 in one direction. A magnetic member in the form of a sleeve 38 fastened on sleeve 35 is movable by a solenoid 39 formed around it. A storage battery 40 or similar means furnishes electrical energy to the solenoid 39 by the connecting electrical lines 41 and 42. A switch 43 in line 41 controls the source of electrical energy to the solenoid 39. A generator or similar device 44 generates electrical energy for the battery 40 by electrical lines 45 and 46. The generator 44 may be driven by motor M' by such means as a belt 47.

In operation, mechanism M' drives shaft 33 and the system of weights W—W and the connecting mechanism including collar 34, links 36, sleeve 35, and magnetic member or sleeve 38. When it is required for any reason to increase the velocity of this rotating system the switch 43 is closed, closing the circuit of the storage battery 40 through lines 41 and 42 to actuate the solenoid 39 by inducing a magnetic flux to act upon the magnetic sleeve 38, to move it and the sleeve 35 from the stop 37, thereby causing the weights W—W to move inwardly toward the center of rotation, and hence increasing the angular velocity of the rotating system. The mechanism M' continuously drives generator 44 by means of the connecting belt 47 to furnish electrical energy to storage battery 40 through the connecting electrical lines 45 and 46. The reservoir of electrical energy is being built up in the storage battery 40 over a relatively long period of time and discharged over a shorter period of time required for the selected instant to move the weights W—W inwardly.

Wheel 49 mounted on shaft 33 may be a wheel of a landing gear of an aircraft. The wheel 49 may be rotated by the driven power mechanism M' and just at the selected instant before the wheels touch the ground the angular velocity of the wheel 49 may be increased by incorporating this invention in the structure to cause the wheel 49 to approach a circumferential velocity approximating the linear velocity of the craft relative to the ground.

It therefore has been demonstrated either mechanical or electrical energy can be utilized as the stored energy in the practice of this invention to control the angular velocity of a rotating body; and my invention extends to the use of any form of energy which is capable of being accumulated, and which may be stored and discharged at a required or selected instant and applied to the uses of this invention to control the angular velocity of a rotating body.

In the embodiment illustrated weights W—W have been used, consisting of solid bodies in simple form, to facilitate explanation of the invention; but this invention is not limited to any particular material of the rotating mass. To illustrate the variety of materials that may be used, another embodiment of this invention is shown in Figs. 4 and 5.

A cylindrical container 50 is provided keyed to shaft 2' and having two annular rows of cells, an outer row of cells 51 and an inner row of cells 52. A stationary plate 53 is fitted on the cylindrical container to form the wall of an annular chamber 54, so provided as to permit a line 55 to conduct air, steam or similar gases under pressure into chamber 54 and to permit the cylindrical container 50 to rotate freely.

A plurality of passages 56 lead from chamber 54 to every alternate cell 51, and passages 57 lead from the balance of cells 51 to corresponding inner cells 52. The cells 51 are connected to each other by ports 58, the cells 52 are connected to each other by ports 59 to permit circulation through the container 50. A liquid is disposed in the container 50 partially filling it.

As the shaft 2' rotates the liquid in cylinder 50 will be forced into the outer cells 51, through the passages 56 and 57, through the ports 58 and 59 by centrifugal force. When the liquid is in the outermost position in the cells 51, air under pressure is admitted from line 55 into chamber 54, through the passages 56, into cells at a point near the inner wall (since centrifugal force holds the liquid against the outer wall) tending to force the liquid at the outer wall of cells 51 through the passages 57 to the inner row of cells 52. Any air trapped in cells 52 will escape through the valve 60. The liquid in cells 52 will flow through the ports 59 and equally distribute itself.

It has in the foregoing been demonstrated that liquid can be used as the mass, and that it can be forced to move to a shorter radial distance from the center of rotation, and thereby increase the angular velocity of the liquid, and that the liquid acting on the walls of the cells 52, will increase the angular velocity of the cylindrical container 50 and all integral members.

Two very different forms of material for mass, solid and liquid, can be used as shown, to obtain the desired results, and enough of the invention has been taught by these illustrated examples to enable those familiar with the art to make proper designs for a singular application of this invention utilizing any desired kind of mass and any type of storable energy in an actuating mechanism to move the mass inwardly toward the center of rotation.

Thus it has been shown that this invention may be used to increase the angular velocity of a rotating body; to decrease the rate of angular velocity; to increase the rate of angular velocity or acceleration of a rotating body having a rotating source of power driving it; to release the tooth pressure of shifting gears in gear trains; to enable stored energy in a system to be used to increase the rotary velocity at selected instance, and applied to other various uses in which increase or decrease angular velocity of a rotating body may be required; by utilizing energy to move a mass in respect to the center of rotation.

In numerous respects, as will be apparent, my invention is not limited to the exact details of construction illustrated and described. Changes and modification may be made, without departing from the spirit of my invention and without sacrificing its advantages, and my invention is comprehensive of all such modifications and changes which come within the scope of the appending claims.

I claim:

1. In a rotary power control device, a rotary member, a power source to drive the rotary member at an angular velocity, a mass mounted to rotate with the rotary member and movable in a relatively radial direction with respect to the axis of rotation, a load mechanism comprising a compressible member provided to absorb energy from the power source, an actuating mechanism responsive to the said loading mechanism expending the compressible energy to cause the rotatable mass to be moved toward the axis of rotation at a selected instant, to thereby increase the instantaneous angular velocity of the mass, to increase the instantaneous angular velocity of the rotary member.

2. In a rotary power control device, a power source, a driving and a driven rotary shaft, said driven shaft adaptable to drive a load, a gear train comprising rotatable power transmitting gears, shifting means to move the rotatable gears to a different gear ratio, to initially cause the power source on the drive shaft to drive the driven shaft and a load thereon by the power transmitting gears at a predetermined gear ratio, a mass mounted to rotate with the driven shaft and movable inwardly and outwardly with respect to the driven shaft, a loading means absorbing energy from the power source, an actuating mechanism effective to move the mass inwardly toward the driven shaft at a selected instant utilizing the energy from the loading means, to thereby increase the angular velocity of the mass, to increase the angular velocity of the driven shaft, to release the tooth pressure of the power transmitting gears and thereby permit the shifting of the power transmitting gears to a different gear ratio.

3. In a rotary power control device, a driving rotary member and a driven rotary member, interconnected through a variable power transmitting device to cause the driving member to drive the driven member at a predetermined angular velocity, a mass rotatable with the driven member and movable inwardly and outwardly with respect to the axis of rotation, a prime mover on the driving member, a loading mechanism to initially absorb a measure of the energy of the prime mover, an actuating mechanism responsive to the said loading mechanism utilizing the absorbed energy, to move the mass inwardly toward the axis of rotation, to thereby increase the instantaneous angular velocity of the mass, to increase the instantaneous angular velocity of the driven member, to increase the angular velocity of the driven member approaching the angular velocity of the driving member to facilitate change to less gear ratio from drive to driven members.

4. In a rotary power control device, a rotary power source on a driving member, and a driven member, interconnected through a variable power transmitting device to cause the driving member to drive the driven member at a predetermined speed ratio by the rotary power source on the driving member, a mass rotatable with the driven member and movable inwardly and outwardly with respect to the axis of rotation, a loading mechanism provided to initially absorb energy from the rotary power source, an actuating mechanism responsive to said loading mechanism and utilizing the absorbed energy, to move the mass inwardly toward the axis of rotation, to thereby increase the instantaneous angular velocity of the mass, to increase the instantaneous angular velocity of the driven member, approaching the angular velocity of the driving member to facilitate coupling the drive and driven members for one-to-one ratio.

5. In a rotary power control device, a power source, a driving member, a driven member, a variable power transmitting mechanism interconnecting the drive and driven member to cause rotary power to be transmitted from the power source on the driving member to the driven member at a predetermined speed ratio, a mass rotatable with the driven member and movable inwardly and outwardly with respect to the axis of rotation, an actuating mechanism to move the mass with respect to the axis and utilizing energy from the power source, to thereby increase the instantaneous angular velocity of the mass, to increase the instantaneous angular velocity of the driven member, approaching the angular velocity of the driving member to facilitate changing to a decreased speed ratio.

6. In a rotary power control device, a power source, a driving member, a driven member, a variable power transmitting mechanism interconnecting the driving and driven members to cause rotary power to be transmitted from the power source on the driving member to the driven member at a predetermined speed ratio, a mass rotatable with the driven member and movable inwardly and outwardly with respect to the axis of rotation, a loading mechanism provided to initially absorb energy from the power source, an actuating mechanism responsive to the said loading mechanism to move the mass with respect to the axis utilizing the absorbed energy, to thereby increase the instantaneous angular velocity of the mass, to increase the instantaneous angular velocity of the rotary member, to approach the angular velocity of the driving member during the instant of rotatable disconnecting the drive and driven members and ultimately permit the coupling of the driving and driven members into a one-to-one ratio.

7. A rotary power control device comprising a rotary member adapted to be connected to a source of power, and driven from said power source, a mass mounted to rotate with said rotary member and being adjustable radially with respect to the axis of rotation, spring means accumulating source energy and operable means to release the accumulated energy and apply it to move said mass radially inwardly so as to increase the angular velocity of the mass and rotary member.

8. A gear shifting mechanism for power transmissions comprising a drive shaft and a driven shaft, speed ratio changing elements associated with said shafts and being shiftable into and out of engagement while rotating, centrifugal masses associated with the driven shaft and spring operated means for changing the radial position of said masses to change the angular velocity of the driven shaft to facilitate the shifting of the said elements.

9. A gear shifting mechanism for power transmissions comprising a drive shaft and a driven shaft, and a counter shaft, gears associated with said shafts and being shiftable into mesh while rotating, a weighted centrifugal mass non-rotatably but slidably secured on the driven shaft, spring means for urging said weights in one direction to increase the angular velocity of the driven shaft under predetermined conditions, and power operated means for moving the weights in the opposite direction to decrease the angular velocity of the driven shaft whereby to facilitate the shifting of the gears.

10. A gear shifting mechanism for power transmissions comprising a drive shaft and a driven shaft speed change elements associated with said shafts and shiftable to obtain different speed ratios, a plurality of weights mounted on the driven shaft and movable radially inwardly and outwardly of said shaft, manually controlled power means for moving said weights in one direction, and spring means for moving said weights in the opposite direction whereby to vary the angular velocity of the driven shaft.

11. A power actuated transmission device comprising a source of power, a drive shaft and a driven shaft driven thereby at a speed ratio, means including a plurality of weights slidably but non-rotatably secured on the driven shaft and radially movable with respect to the axis of the driven shaft to vary the angular velocity of the driven shaft, a spring to absorb energy from the power source and operable to move said weight inwardly to the driven shaft to facilitate changing the speed ratio between the drive and driven shafts.

12. A power actuated rotary control device comprising a driven shaft, a plurality of masses mounted to rotate with said driven shaft and adjustable in a radial direction with respect to the axis of rotation thereof, a power source for driving the driven shaft at the desired angular velocity, a spring loading mechanism for absorbing energy from the power source, and means for releasing this spring energy to act upon said masses to move the same radially inwardly toward the axis of rotation thereof whereby to increase the instantaneous angular velocity of the rotating masses and to increase the instantaneous angular velocity of the driven shaft.

13. In a rotary control device, a rotary member, a motor power source for driving said rotary member, a mass mounted to rotate with said rotary member and generally radially adjustable with respect thereto, spring means for urging said mass in one radial direction and power operated means for moving the mass in the opposite radial direction to potentially store energy in said spring, and means to release said potential energy in said spring to move said mass to change the instantaneous angular velocity of said rotary member.

14. In a rotary control device, a rotary member, a motor power source for driving said rotary member, a plurality of weights mounted on the rotary member and movable inwardly to and outwardly from the axis of said rotary member, power means for moving said weights outwardly, spring means accumulating source power, and means for releasing the accumulated power for moving said weights inwardly whereby to vary the angular velocity of the rotary member.

15. A power actuated rotary control device comprising a rotary member, a plurality of masses mounted to rotate with said rotary member and adjustable in a radial direction with respect to the axis of rotation thereof, a power source for driving said rotary member at a desired angular velocity, a spring loading mechanism for accumulating energy from the power source, and means for releasing this accumulated energy at a selected instant to act upon said masses to move the same inwardly toward the axis of rotation thereof whereby to increase the angular velocity of the rotating masses and to increase the angular velocity of the rotating member.

16. In a rotary power control device, a rotary member, adapted to be driven by a power source at an angular velocity, a mass mounted to rotate with the rotary member and movable in a relatively radial direction with respect to the axis of rotation, a spring means provided to potentially store energy from the power source, and a mechanism actuated by the accumulated energy to cause the rotatable mass to be moved toward the axis of rotation, to thereby supplement energy of the power source to increase the instantaneous angular velocity of the mass commensurably with the movement of the mass toward the axis of rotation, to increase the instantaneous angular velocity of the rotary member.

17. In a rotary control device, a power driven rotary member, an inertia mass mounted thereon rotatable with said member, a spring actuating mechanism for moving said inertia mass relative to the axis of rotation, a control means for said spring actuating mechanism to move said inertia mass inwardly at a relative rate to the axis of rotation to reduce the moment of inertia, to increase the instantaneous angular velocity of the inertia mass and rotary member.

18. In a rotary power control device, a rotary member, a motor driven power source for driving said rotary member, an inertia mass mounted to rotate with said rotary member and radially adjustable with respect to the axis of rotation, a spring loading mechanism operable when said mass is adjusted outwardly, and means for controlling said spring loading mechanism to adjust said mass inwardly toward the axis at a selected rate to thereby control the increased instantaneous angular velocity of the rotating mass and rotary member.

HARRY ORNER.

(References on following page)

REFERENCES CITED

The following references are of record in the file of this patent:

UNITED STATES PATENTS

| Number | Name | Date |
|---|---|---|
| 1,799,392 | Rhys | Apr. 7, 1931 |
| 2,179,405 | DeFalco | Nov. 7, 1939 |
| 2,242,374 | Schultz et al. | May 20, 1941 |
| 2,301,943 | Georg | Nov. 17, 1942 |
| 2,346,820 | Casler et al. | Apr. 18, 1944 |

FOREIGN PATENTS

| Number | Country | Date |
|---|---|---|
| 227,120 | Germany | Oct. 17, 1910 |
| 423,072 | Great Britain | Jan. 24, 1935 |